United States Patent
Lu et al.

(10) Patent No.: US 9,992,187 B2
(45) Date of Patent: Jun. 5, 2018

(54) SINGLE SIGN-ON AUTHENTICATION VIA BROWSER FOR CLIENT APPLICATION

(71) Applicant: CISCO TECHNOLOGY, INC., San Jose, CA (US)

(72) Inventors: Jiajun Lu, Southborough, MA (US); Songling Han, Santa Clara, CA (US); Andrzej Kielbasinski, Grafton, MA (US); Peter Davis, Wakefield, MA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 14/977,569

(22) Filed: Dec. 21, 2015

(65) Prior Publication Data

US 2017/0180351 A1   Jun. 22, 2017

(51) Int. Cl.
*H04L 29/06*   (2006.01)

(52) U.S. Cl.
CPC ...... *H04L 63/0815* (2013.01); *H04L 63/0876* (2013.01)

(58) Field of Classification Search
CPC .................. H04L 63/0815; H04L 63/0876
USPC ............................................................ 726/6
See application file for complete search history.

(56) References Cited

U.S. PATENT DOCUMENTS

| | | | | |
|---|---|---|---|---|
| 7,865,943 B2* | 1/2011 | Hayler | ................ | G06F 12/1466 713/150 |
| 8,898,746 B2* | 11/2014 | Gregg | ..................... | H04L 63/10 726/29 |
| 9,065,819 B1* | 6/2015 | Shanmugam | ....... | H04L 63/0815 |
| 9,225,711 B1* | 12/2015 | Sorensen | ............... | H04W 12/06 |
| 2002/0059425 A1* | 5/2002 | Belfiore | ..................... | G06F 9/54 709/226 |
| 2003/0163733 A1* | 8/2003 | Barriga-Caceres | ..... | G06F 21/33 726/5 |
| 2004/0128546 A1* | 7/2004 | Blakley, III | ........ | G06F 21/6245 726/8 |
| 2004/0250118 A1* | 12/2004 | Andreev | ............. | H04L 63/0815 726/8 |
| 2006/0048216 A1* | 3/2006 | Hinton | ................ | H04L 63/0815 726/8 |

(Continued)

OTHER PUBLICATIONS

OASIS Open, 'Assertions and Protocol for the OASIS Security Assertion Markup Language (SAML) V1.1', oasis-sstc-saml-core-1.1, Sep. 2, 2003, OASIS Open, entire document, https://www.oasis-open.org/committees/download.php/3406/oasis-sstc-saml-core-1.1.pdf.*

(Continued)

*Primary Examiner* — Jahangir Kabir
*Assistant Examiner* — Ronald Baum
(74) *Attorney, Agent, or Firm* — Cindy Kaplan

(57) ABSTRACT

In one embodiment, a method includes initiating at a client application at a client device, a single sign-on authentication with a security device, receiving at the client application, a session identifier and location of a web portal for the single sign-on authentication from the security device, and passing the session identifier and location of the web portal from the client application to a browser installed at the client device, for use by the browser in performing the single sign-on authentication at the client device. An apparatus and logic are also disclosed herein.

17 Claims, 9 Drawing Sheets

(56) References Cited

U.S. PATENT DOCUMENTS

| | | | | |
|---|---|---|---|---|
| 2006/0075110 | A1* | 4/2006 | Seraphin | H04L 63/08 709/227 |
| 2006/0075224 | A1* | 4/2006 | Tao | G06F 21/121 713/164 |
| 2006/0265740 | A1* | 11/2006 | Clark | G06F 21/34 726/8 |
| 2006/0294196 | A1* | 12/2006 | Feirouz | G06F 17/30899 709/217 |
| 2009/0292927 | A1* | 11/2009 | Wenzel | G06F 21/41 713/185 |
| 2010/0049790 | A1* | 2/2010 | Schreiber | G06Q 30/0273 709/203 |
| 2010/0064134 | A1* | 3/2010 | Gross | H04L 63/0815 713/155 |
| 2010/0153862 | A1* | 6/2010 | Schreiber | G06Q 30/0273 715/760 |
| 2011/0055912 | A1* | 3/2011 | Fusari | G06F 17/30893 726/8 |
| 2011/0154464 | A1* | 6/2011 | Agarwal | H04L 63/0815 726/8 |
| 2011/0202989 | A1* | 8/2011 | Otranen | H04L 63/0815 726/8 |
| 2011/0307940 | A1* | 12/2011 | Wong | G06F 21/31 726/4 |
| 2012/0151568 | A1* | 6/2012 | Pieczul | H04L 63/0815 726/8 |
| 2012/0210413 | A1* | 8/2012 | Akula, Sr. | H04L 63/0815 726/8 |
| 2012/0260321 | A1* | 10/2012 | Wendt | H04L 9/0863 726/5 |
| 2013/0174241 | A1* | 7/2013 | Cha | H04L 63/0815 726/7 |
| 2014/0040979 | A1* | 2/2014 | Barton | H04L 63/20 726/1 |
| 2014/0082715 | A1* | 3/2014 | Grajek | H04L 63/0815 726/8 |
| 2014/0189839 | A1* | 7/2014 | Jezek | H04L 63/0815 726/8 |
| 2014/0298441 | A1* | 10/2014 | Yamaguchi | H04L 63/0807 726/8 |
| 2015/0007263 | A1* | 1/2015 | Stewart | H04L 63/0815 726/3 |
| 2015/0089617 | A1* | 3/2015 | Sondhi | H04L 63/08 726/8 |
| 2015/0121501 | A1* | 4/2015 | Khalid | H04L 63/0815 726/8 |
| 2015/0188906 | A1* | 7/2015 | Minov | H04L 63/0815 726/8 |
| 2016/0012465 | A1* | 1/2016 | Sharp | G06Q 20/18 705/14.17 |
| 2016/0065571 | A1* | 3/2016 | Hoyos | H04L 63/0861 713/168 |
| 2016/0294797 | A1* | 10/2016 | Martin | H04L 63/0236 |
| 2016/0380999 | A1* | 12/2016 | Tevlin | H04L 63/0815 713/151 |

OTHER PUBLICATIONS

Informatica Cloud, 'Informatica Cloud Single Sign On', Sep. 5, 2017, Informatica Cloud, entire document, https://successacademy.informatica.com/portal/sites/default/files/Informatica%20Cloud%20Single%20Sign%20On%20Overview_0.pdf.* salesforce.com, inc, "Single Sign-On Implementation Guide, Salesforce, Spring '17", Copyright 2000-2017, salesforce.com, inc., entire document, https://resources.docs.salesforce.com/206/latest/en-us/sfdc/pdf/salesforce_single_sign_on.pdf.*

\* cited by examiner

SINGLE SIGN-ON AUTHENTICATION VIA BROWSER FOR CLIENT APPLICATION

TECHNICAL FIELD

The present disclosure relates generally to communication networks, and more particularly, to authentication.

BACKGROUND

Many organizations adopt various solutions to implement SSO/SLO (Single Sign-On/Single Log-Off) to reduce complexity for their web based enterprise services. SSO/SLO technology greatly enhances the user experience by offering a single login clientless portal to approved applications and data. Users may be allowed to authenticate at a single location, with a single account, and access a wide range of services, thereby providing a seamless experience for the end-user and critical visibility and control for organizations. However, the diverse and constantly changing devices and applications used to access cloud based services make SSO/SLO difficult to implement and may result in the need for multiple authentications.

BRIEF DESCRIPTION OF THE FIGURES

Corresponding reference characters indicate corresponding parts throughout the several views of the drawings.

DESCRIPTION OF EXAMPLE EMBODIMENTS

Brief Summary of the Embodiments

Figure 1:
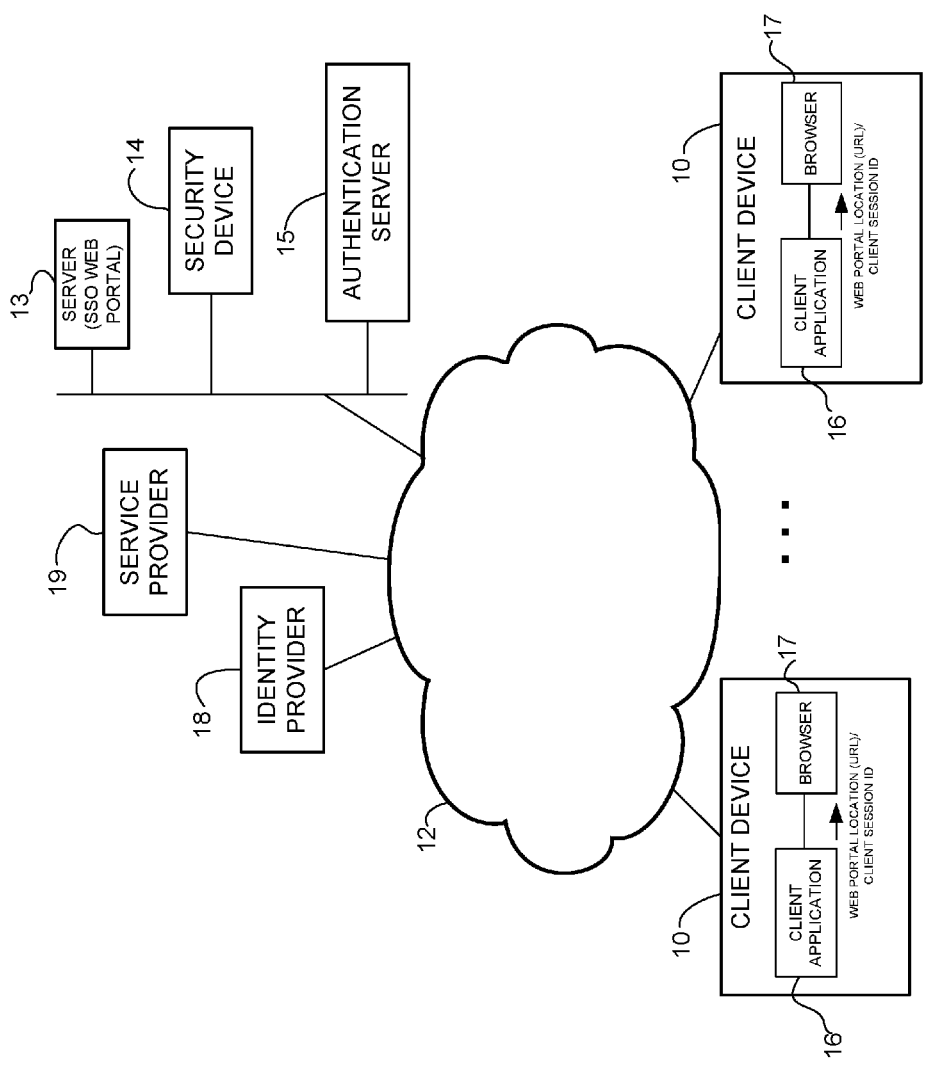
FIG. 1 illustrates an example of a network in which embodiments described herein may be implemented.

In one embodiment, a method generally comprises initiating at a client application at a client device, a single sign-on authentication with a security device, receiving at the client application, a session identifier and location of a web portal for the single sign-on authentication from the security device, and passing the session identifier and location of the web portal from the client application to a browser installed at the client device, for use by the browser in performing the single sign-on authentication at the client device.

In another embodiment, an apparatus generally comprises an interface for communication with a client device comprising a client application and a browser, and a processor for processing a request from the client application for a single sign-on authentication, generating a client session between the security device and the client application, transmitting a client session identifier and a location of a web portal for the single-sign on authentication to the client application, and processing the single sign-on authentication with the browser using the client session identifier and web portal location received from the browser. The client session is associated with a web session used to perform the single-sign on authentication with the browser.

In yet another embodiment, logic is encoded on one or more non-transitory computer readable media for execution and when executed operable to initiate at a client application at a client device, a single sign-on authentication with a security device, process at the client application, a session identifier and location of a web portal for the single sign-on authentication received from the security device, and pass the session identifier and location of the web portal from the client application to a browser installed at the client device for use by the browser in performing the single sign-on authentication at the client device.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Single Sign-On (SSO) technology allows end users to apply their existing secure credentials and get authenticated once to gain access to those applications to which the end user has been approved access. SSO authentication removes the complexity of offering clients access to disparate applications across the network and replaces this with a single point of access to the applications. SSO also helps organizations enforce unified authentication for secure access to multiple applications and services, thus improving overall security. However, even with the advent of SSO, there are still many applications in which users need to login more than once. For example, applications utilizing embedded browsers may still require additional authentication.

The embodiments described herein allow client applications to use web browsers to perform SSO authentication so that end users only need to log in once. The embodiments may be used to extend web based SSO/SLO to standalone client applications (desktop applications, mobile applications) so that the client applications can work with web browser based applications seamlessly. For example, the end user may log in once for a VPN (Virtual Private Network) and then automatically be granted access for other applications that support SSO without further logins. One or more embodiments eliminate the need to send information from the web browser to the client application, thus eliminating the need for installation of ActiveX control, Java applet, browser based plugins, or a local web socket. Since the embodiments do not rely on these components, there is no additional effort needed to support different types of operating systems and web browsers and security risks introduced by these additional components is avoided. In certain embodiments, a web browser that is widely supported by different platforms, including for example, Windows, MAC OS X, and Linux may be used to forward a single login request for SSO authentication.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, firewalls, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network).

The network shown in the example of FIG. 1 includes a plurality of client devices (users, hosts, endpoints) 10 in communication with a security device 14 and an authentication server 15 (e.g., Authentication, Authorization, and Accounting (AAA) server) via a network 12 (e.g., public network, Internet). The network 12 is also in communication with one or more identity providers 18 or service providers 19 comprising one or more service applications. An authentication function may be performed at any of the network devices (e.g., security device 14, authentication server 15, identity provider 18). The security device 14, authentication server 15, identity provider 18, and service provider 19, or any combination thereof may be located at the same network (e.g., enterprise or other private network) or at one or more different networks or in a cloud.

The identity provider (IdP) 18 may be responsible for issuing identification information for network devices wanting to interact with the service provider 19 and for the actual authentication of users. For example, the identity provider 18 may support various authentication mechanisms, including user/password based authentication for LDAP (Lightweight Directory Access Protocol), Kerberos authentication, SmartCard based authentication, and others. The identity provider 18 may support a variety of protocols, including for example, SAML (Security Assertion Markup Language), which is an WL-based open standard data format that may be used to exchange authentication and authorization data between the identity provider and the service provider 19. The identity provider 18 and service provider 19 may operate at one or more servers in communication with network 12. The functions of one or more of the identity provider 18 and service provider 19 may also be embodied by processes running in a data center in a cloud computing environment, for example.

The security device 14 may comprise any appliance (e.g., Cisco ASA (Adaptive Security Appliance), server (e.g., VPN server), network element, or general purpose computing device, which may be located in a network or in a cloud or fog environment. The security device 14 may be in communication with authentication server 15 or co-located at the same network device as the authentication server. The security device 14 may, for example, validate user credentials with the authentication server 15. The security device 14 may also include or be in communication with a web or VPN server (e.g., SSO web portal 13). As described below, the security device 14 is operable to provide to the client 10 an HTTP (Hypertext Transfer Protocol) service and authentication service at the security device or at another device (e.g., authentication server, identity provider) via redirection.

The client device 10 may comprise, for example, a desktop computer, laptop computer, mobile phone, tablet, personal digital assistant, or any other device operable to communicate with network 12. The client device 10 may be a managed or unmanaged device. For example, a user may attempt to access a network from a corporate-managed personal computer, personal network-accessible device, or public terminal. The client device 10 may be a wired device or wireless device, or configured for both wired communication (e.g., connected to a docking station) and wireless communication. The client device 10 may be in communication with any number of networks (e.g., Internet, VPN (Virtual Private Network), enterprise, corporate network, data center, and the like).

As shown in FIG. 1, the client device 10 may include a client application (standalone application, desktop application, mobile application, client, agent) 16 and a browser (web application, web browser, default browser) 17. In one embodiment, the client application 16 comprises a security mobility client (e.g., Cisco AnyConnect), VPN client, or other client or agent. The term "client application" as used herein may refer to any application or software (e.g., client, agent, application, mobile application, desktop application, or module) operable to run on any client device (e.g., mobile device, computer (laptop, desktop), wired or wireless device) and interact with a browser installed at the client device.

The client application 16 may be configured, for example, to support SAML (Security Assertion Markup Language) or other similar language or protocol so that users only need to perform a web based SSO once for a client session (e.g., VPN session) and all SAML supported web applications. An SAML SSO assertion may be linked with a client session used in the SSO authentication process. As described in detail below, the embodiments leverage the browser 17 on the client device 10 to integrate SSO with the client based session. The client application 16 is operable to launch the browser 17 using security information (e.g., session key) obtained from the security device 14 for use in an SSO authentication process.

The browser 17 may comprise any type of application installed at the client device 10 and operable to retrieve or transmit information on the World Wide Web (web). Examples of browsers include Google Chrome, Firefox, Internet Explorer, Opera, and Safari. Other browser applications may also be used. As shown in FIG. 1, the browser 17 is separate (distinct, independent) from the client application 16 (i.e., not embedded within the client application). As described below, the authentication session is performed via the browser 17 rather than directly between the client application 16 and security device 14. In certain embodiments, the browser 17 may include a clientless VPN or other web browser based application that may be used to setup a VPN channel. As noted above, the embodiments do not rely on any browser plugins/add-ons, Java applets, Active X controls, or other third party applications. Since the default browser 17 is used for the SSO/SLO process, there is no need for the client application 16 to include a built in browser.

As shown in the example of FIG. 1, the security device 14 is in communication with a server comprising a web portal 13 for use in SSO authentication. The web portal may also be located at the security device 14, identity provider 18, service provider 19, or other network device. During the authentication process, the security device 14 may provide the client device 10 a location of the web portal (e.g., URL (Uniform Resource Locator)). The URL is returned to the client application 16 upon initiation of a login request by the client application. The client application 16 forwards the URL along with a session identifier (ID) to the browser 17, for use by the browser in performing the SSO authentication through the web portal with the session ID. The URL may be, for example, the URL of a single sign-on service that an enterprise is using. The session identifier may be created from a client application channel, which may be protected by conventional security means. Upon receiving the URL and session ID, the client application 16 may generate a request (e.g., HTTP GET request) for the web browser 17. A web browser session is used to check the existing session between the client application 16 and security device 14. If the session ID is not valid, the web server returns an error message. Thus, if users attack the web server using fake session IDs, the server may block the client.

The HTTP request may be used to redirect the client 10 to the web portal 13 (e.g., clientless portal, web server, VPN server) that initiates the SSO process. For example, the browser 17 may transmit the HTTP GET with the authentication request to the identity provider 18. The identity provider 18 may respond to the HTTP GET with a user login form. User provided credentials may be inserted into the login form and the credentials sent by the browser application 17 to the identity provider 18. During the authentication process, a channel between the client application 16 and security device 14 may remain open. Once authentication is complete, the client 16 may be notified of the results of the authentication via this channel.

An example of communications between the client application 16, web application 17, and security device 14 in an SSO and SLO process are described below with respect to FIGS. 4 and 5, respectively. Additional details of communication flow between the elements shown in FIG. 1 are provided below with respect to FIGS. 6-9, in accordance with one embodiment.

It is to be understood that the network devices and topology shown in FIG. 1 and described above is only an example and the embodiments described herein may be implemented in networks comprising different network topologies or network devices, or using different protocols or languages, without departing from the scope of the embodiments. For example, any of the components or functions of the security device 14, authentication server 15, web portal 13, identity provider 18, and service provider 19 may be co-located or distributed among any number of network devices located in one or more networks or cloud. The network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network, which may include cloud or fog computing. Nodes may be coupled to other nodes through one or more interfaces employing any suitable wired or wireless connection, which provides a viable pathway for electronic communications.

Figure 2:
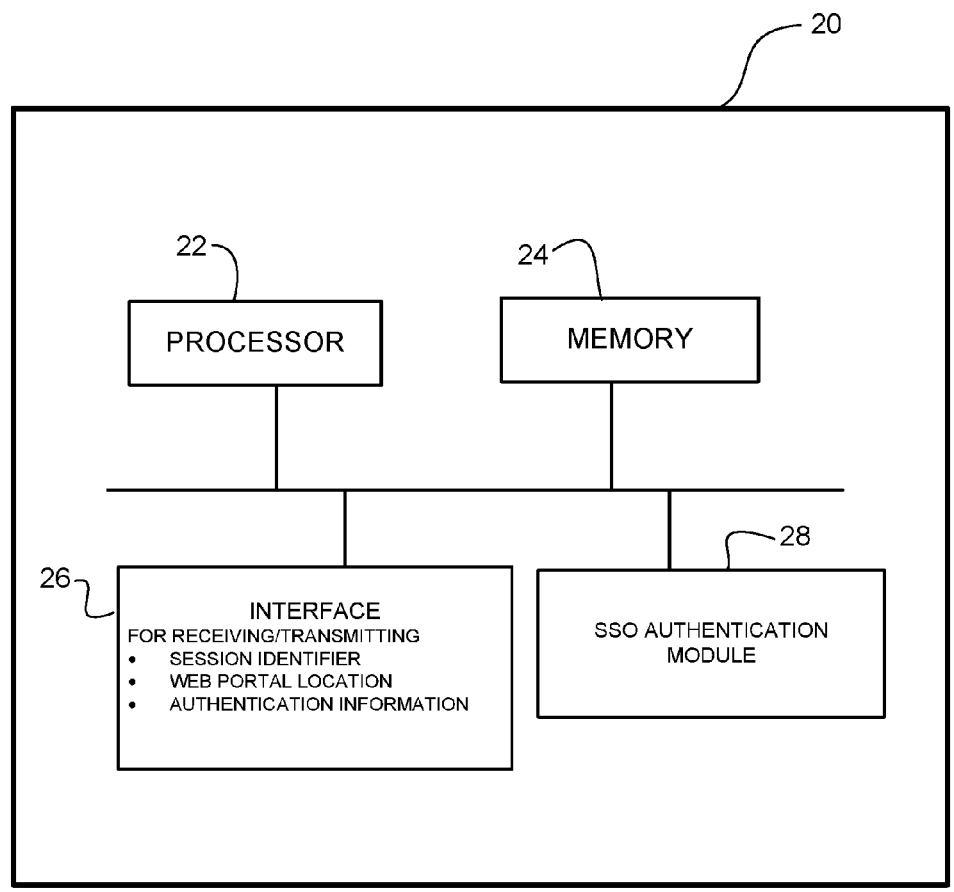
FIG. 2 depicts an example of a network device useful in implementing embodiments described herein.

FIG. 2 illustrates an example of a network device 20 (e.g., client device 10, security device 14 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and SSO module 28 (e.g., software, firmware, code, logic) for use in the SSO authentication process (e.g., generating, transmitting, or receiving session or authentication information).

Memory 24 may be a volatile memory or non-volatile storage, which stores various applications, operating systems, modules, and data for execution and use by the processor 22. Memory 24 may include, for example, one or more databases (e.g., for storing session information (e.g., session IDs, session keys), URLs, authentication information) or any other data structure configured. Components of the SSO module 28 may also be stored in memory 24. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform processes described below with respect to FIGS. 3-9. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. The interface 26 may be operable to receive or transmit a session identifier, web portal location, or any other authentication information (e.g., user's login credentials). An internal interface (e.g., API (Application Programming Interface)) may be used to provide communication between the client application 16 and web browser 17. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network. As noted above, the client device 10 may comprise an interface configured for wireless communication with the network 12 (FIG. 1).

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
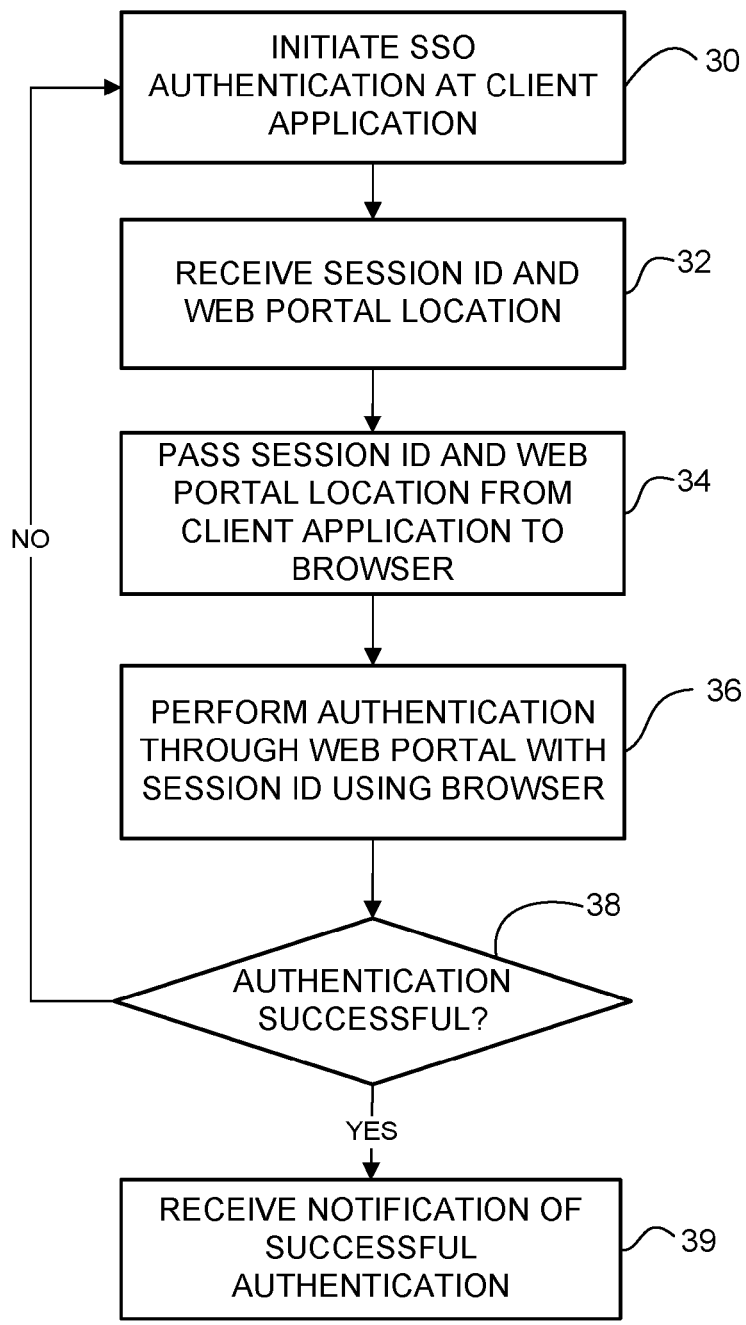
FIG. 3 is a flowchart illustrating an overview of a process for SSO authentication via a browser for a client application, in accordance with one embodiment.

FIG. 3 is a flowchart illustrating an overview of a process for authentication for a client application via a browser, in accordance with one embodiment. At step 30, the client application 16 initiates SSO authentication (FIGS. 1 and 3). The client device 10 may, for example, receive user input in the form of a selected icon on a graphical user interface (GUI), input of text, or any other input or selection indicating that an authentication process needs to be performed. This triggers creation of an out of band SSO based session key. For example, in response to the connection request being transmitted from the client application 16 to the security device 14, the client may receive a session identifier and a location of a web portal (e.g., URL) for the SSO process from the security device (step 32). The session identifier may be, for example, a temporary client session identifier (session ID, session key). The response may also include a timeout value, which may comprise a short timeout value used to track an SAML (Security Assertion Markup Language) login session from the client application 16 and mutually agreed to by both the client application and the security device. The timeout may be used to clean up a dead session if the user does not finish the authentication in an allotted time.

The client device 10 passes the session ID and web portal location to the browser (e.g., launches the browser) (step 34). The client device 10 may then perform authentication with the web portal 13 using the browser 17 (step 36). The browser SSO session is bound to the client session (e.g., VPN session) by the session ID, which may be presented over HTTPS (Hypertext Transfer Protocol Secure) to the security device 14. As described in detail below, the browser 17 uses the session key to communicate with the security device 14. This may include opening of the web portal 13 with the session key using the default web browser 17. The user may then sign in to the authentication server with the user's credentials. If the authentication is successful, the client may receive a notification of successful authentication (steps 38 and 39) and the security device 14 allows the session to go forward. If the authentication was not successful, the client may again attempt to initiate authentication.

It is to be understood that the process shown in FIG. 3 and described above is only an example and that steps may be added, combined, deleted, or modified without departing from the scope of the embodiments.

Figure 4:
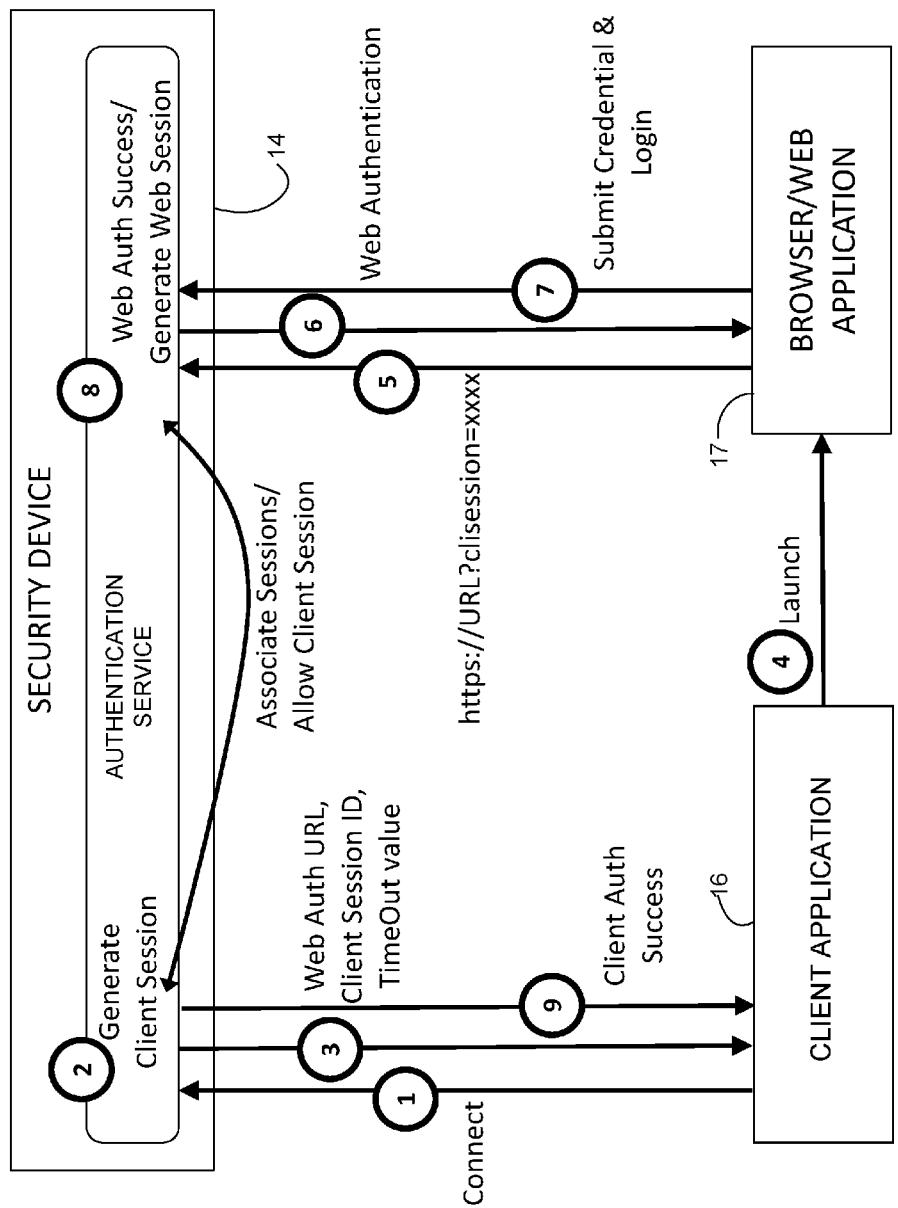
FIG. 4 is a diagram illustrating SSO communications between a security device, client application, and browser, in accordance with one embodiment.

FIG. 4 is a diagram illustrating an overview of processes performed between components of the authentication system shown in FIG. 1, in accordance with one embodiment. At (1), the user initiates a connection by selecting a "connect" icon or button, entering text, or any other action that causes the client application 16 to initiate authentication. The security device 14 generates a temporary client session (2) and sends a session ID and URL (Uniform Resource Locator) of the web portal (3). The response may also include a timeout value. The client application 16 opens the web portal with the session key using the default web browser 17 (4). A system API (Application Programming Interface) may be used to launch the browser 17, for example. The user continues with the web browser 17 and performs the authentication through the web portal with the session key (5). The authentication may be redirected to the authentication server (at security device 14, identity provider 18, or other device in communication with the security device) and a response is sent to the browser (6). The user can then sign-in to the authentication server with the user's credentials (7). Once authentication is complete, the authentication server may notify the initial authentication service for the client 16 (8) and the client may be notified when the authentication is successful (9).

In contrast to conventional authentication processes in which separate sign-in/authentications are requested between the client application and security device, and the browser and security device, the process shown in FIG. 4 allows for direct communication between the client application 16 and browser 17, resulting in only one sign-in/authentication needed by the user at the client device. The embodiments allow the client 16 to use the web browser 17 to perform authentication. Thus, with the SSO authentication embodiments described herein, users only need to log in once for a VPN, and are then automatically granted access for other applications that support the SSO.

Figure 5:
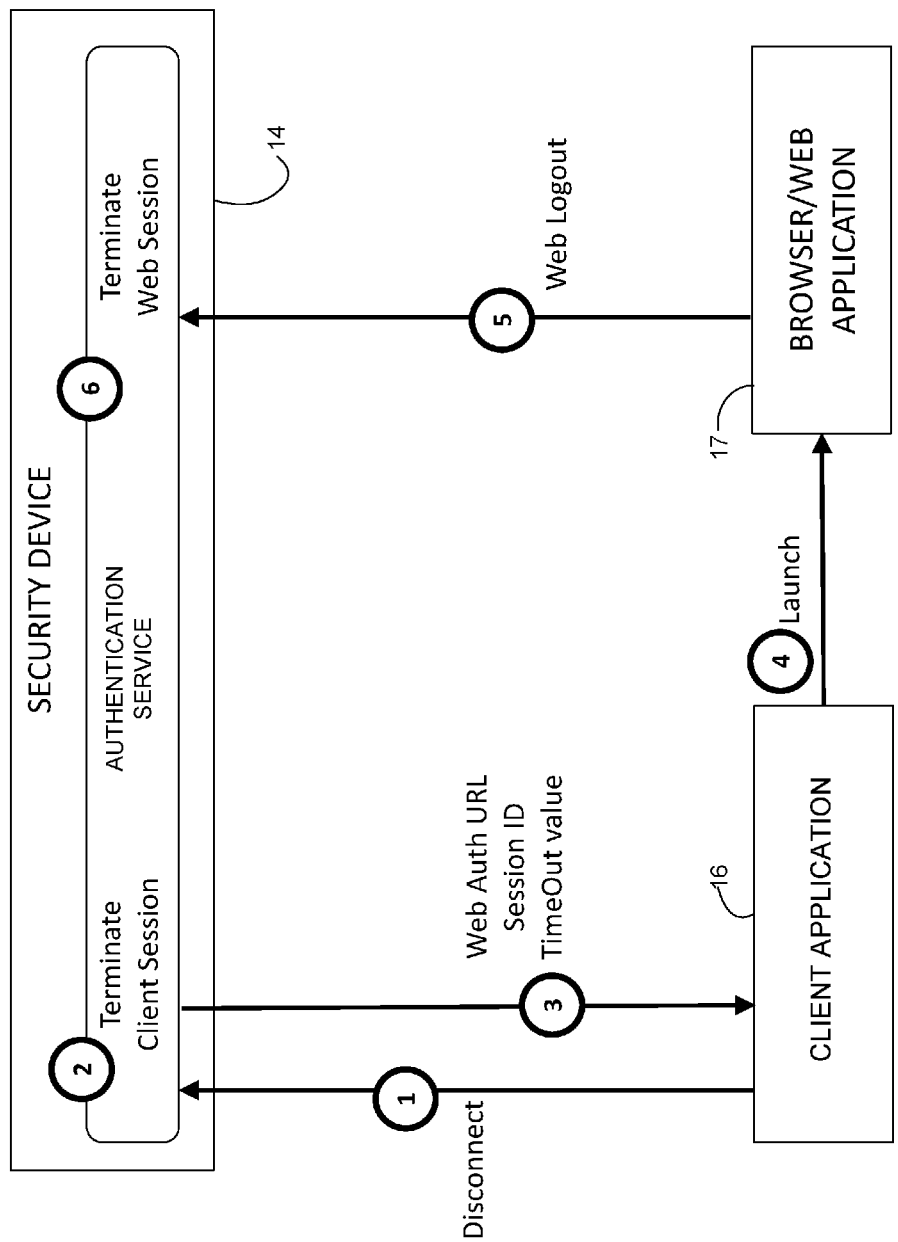
FIG. 5 is a diagram illustrating SLO communications between the security device, client application, and browser, in accordance with one embodiment.

FIG. 5 illustrates an SLO process, in accordance with one embodiment. The user initiates the logoff by selecting a "disconnect" button (icon, selectable item, or enters appropriate text) (1). The security device 14 terminates the associated desktop client session (2) and replies with the web portal and the session key (3). The client application 16 launches the web browser (4) and logs out from the web based authentication service (5). The web session is then terminated (6). In contrast with conventional SLO processes, which require a first sign-out between the client application 16 and service and a second sign-out between the browser and service, the embodiments utilize communication between the client application and browser so that only one web logout is needed for SLO.

Figure 6:
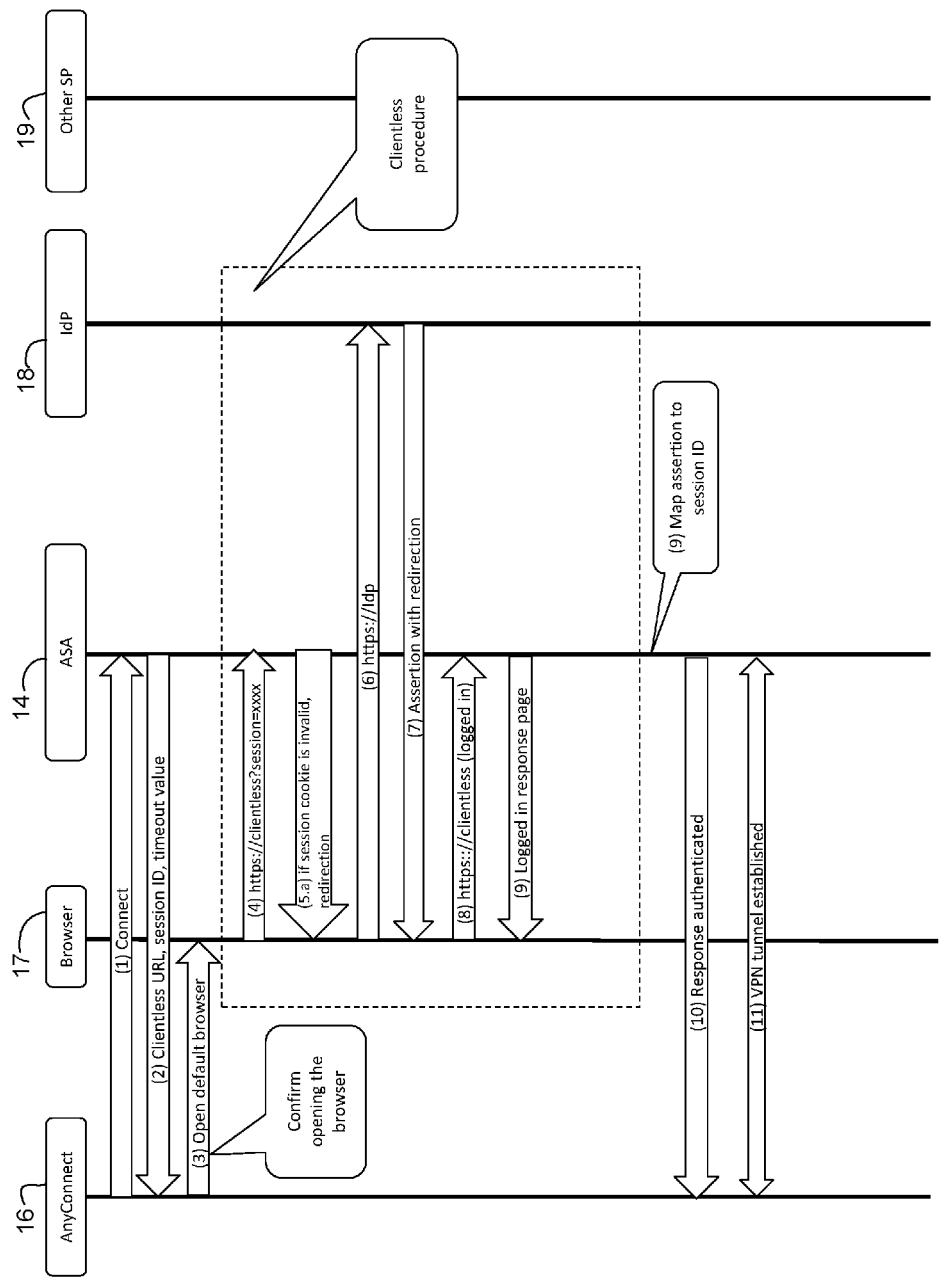
FIG. 6 is a diagram illustrating communication flow between components of the system shown in FIG. 1 for a new client login, in accordance with one embodiment.

FIG. 6 illustrates communication flow for a new login between the components shown in FIG. 1, in accordance with one embodiment. In the example shown in FIG. 6, the client application 16 comprises AnyConnect and the security device 14 comprises Adaptive Security Appliance (ASA). The client application 16 is in communication with the browser 17, which communicates with the Identity Provider (IdP) 18 or other service provider 19. At (1) the client application 16 initiates a connection with the security device 14. The security device 14 responds with a clientless URL (web portal), session ID, and timeout value (2). The client application 16 also opens the default browser 17 at the client device 10 (3). The browser 17 contacts the security device 14 using the session ID and URL from the desktop application (4). If the session cookie is invalid, a redirection is performed (step 5.a). Otherwise, the browser contacts the IdP (6). The IdP 18 responds with an assertion with redirection (7). The browser 17 then contacts the login page (8) and user credentials are entered in a response page (9). An SAML assertion (web session) may be mapped to the client session ID. The security device 14 authenticates the client (10) and a VPN tunnel is established between the client application 16 and security device 14.

Figure 7:
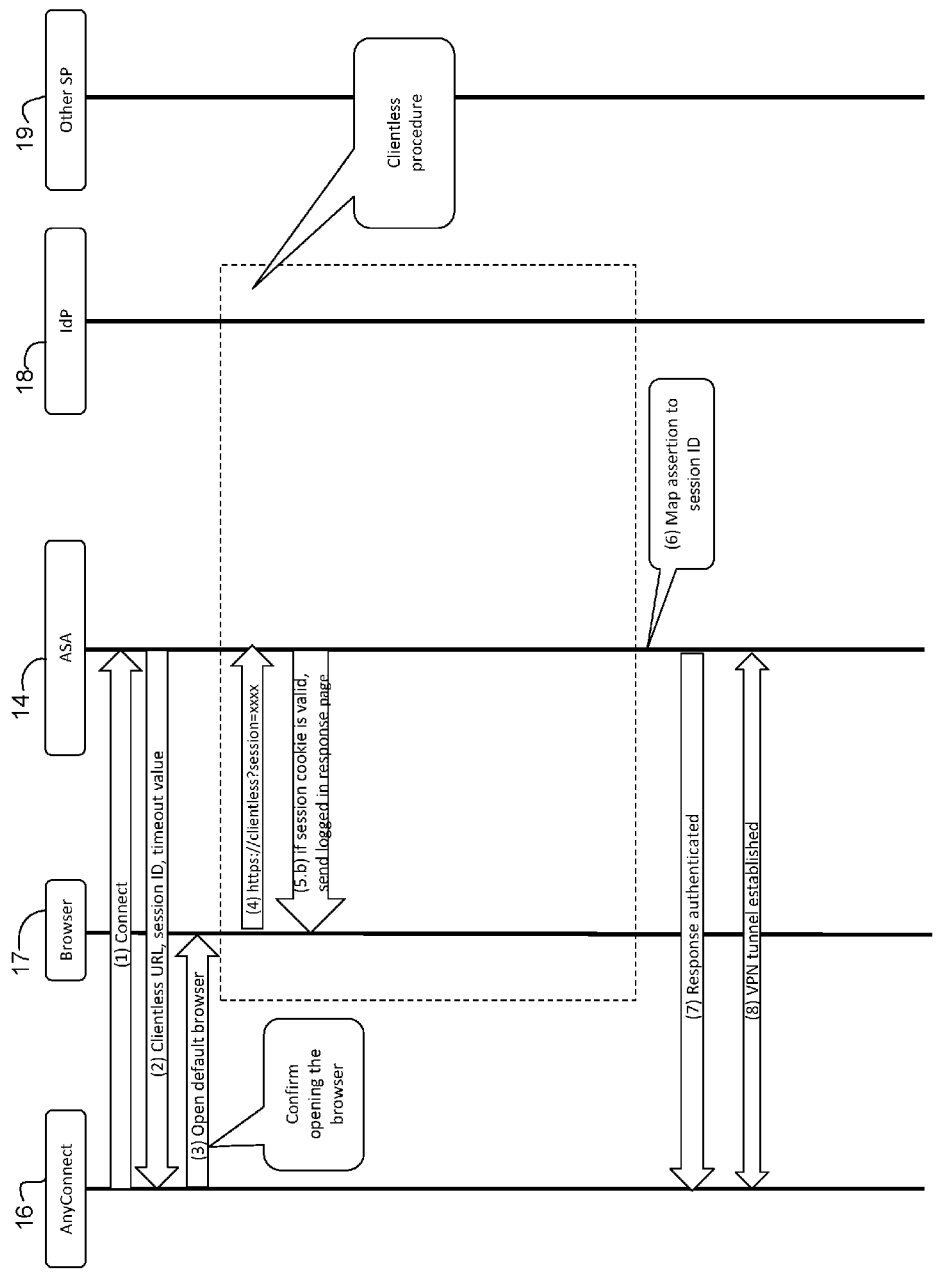
FIG. 7 is a diagram illustrating communication flow between components of the system shown in FIG. 1 for access to an application after the client has completed SSO authentication, in accordance with one embodiment.

FIG. 7 illustrates a process performed after the client is already logged in per the SSO authentication shown in FIG. 6. Once the client is logged in, requests to connect to another service using the same SSO will follow steps (1)-(4) shown in FIG. 6 and previously described. At step (5b), if the session cookie is valid, the logged in response page is sent from the security device 14 to the browser 17. The assertion may be mapped to the session ID (6) as described above. The response is authenticated (7) and VPN tunnel established (8). There is no additional sign-in required by the client 16.

Figure 8:
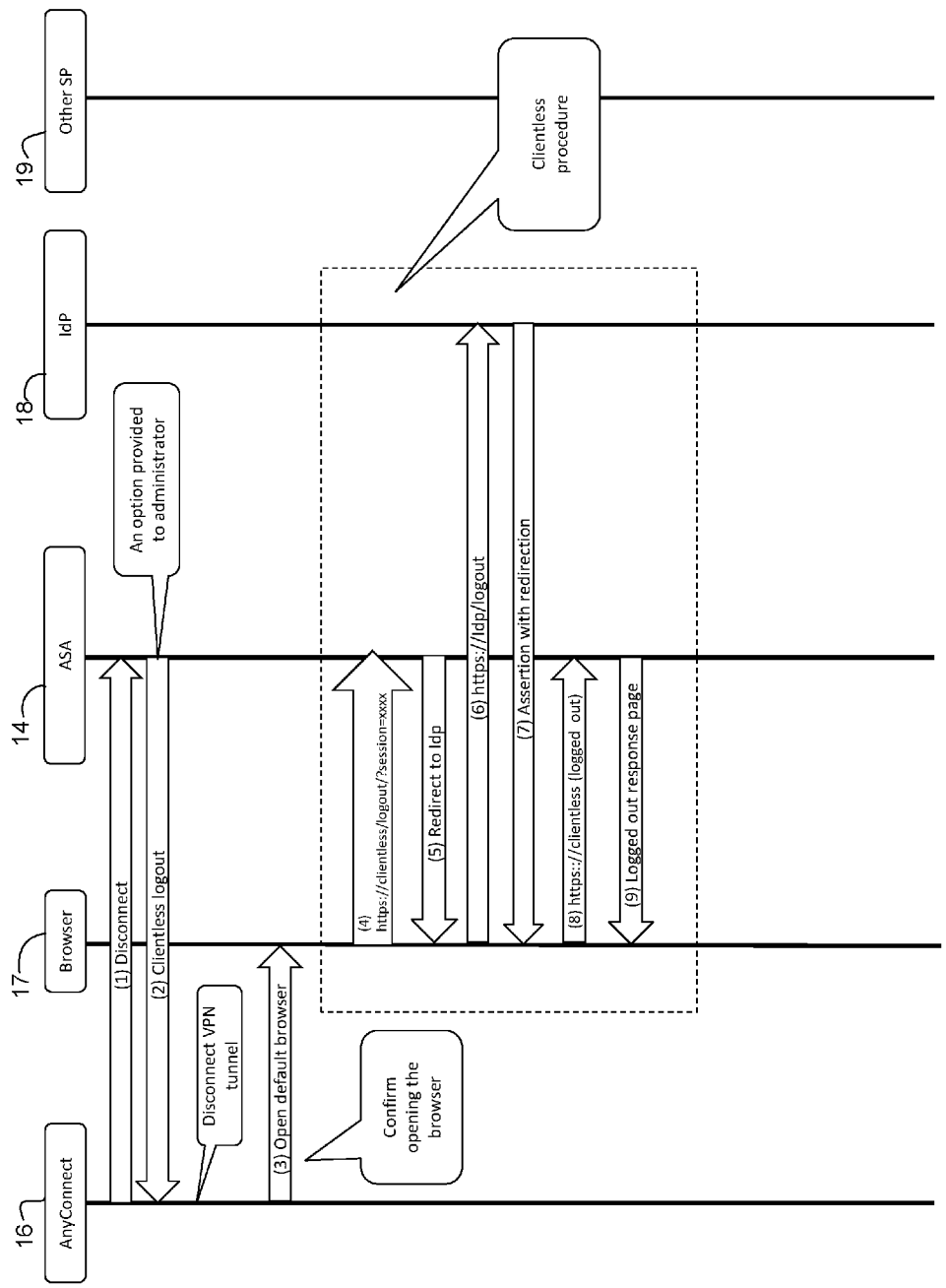
FIG. 8 is a diagram illustrating communication flow between components of the system shown in FIG. 1 for a logout initiated from AnyConnect, in accordance with one embodiment.

FIG. 8 illustrates an example of a logout procedure initiated from AnyConnect, in accordance with one embodiment. The client application (AnyConnect) 16 initiates a disconnect (1). A clientless logout may be performed (2) as this is an option that may be provided to an administrator. The VPN tunnel is then disconnected and the default browser 17 is opened by the desktop application 16 (3). A logout message is transmitted from the browser 17 to the security device 14 and the security device redirects the browser to IdP 18 (5). The browser contacts the IdP logout page (6) and the IdP sends an assertion with redirection (7). The browser contacts the log out page at the security device (8) and the client is logged out. A logout response page is sent from the security device 14 to the browser 17.

Figure 9:
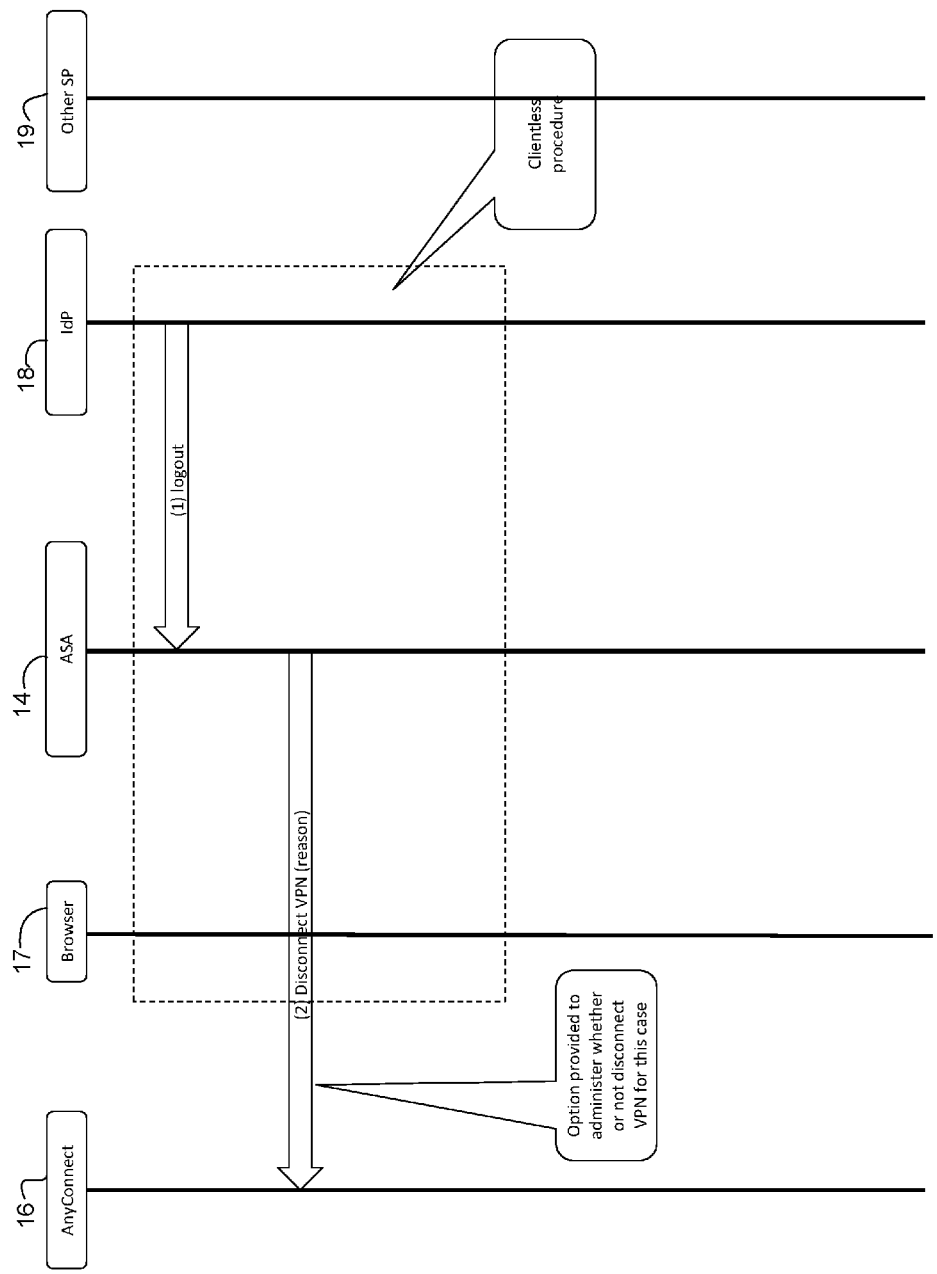
FIG. 9 is a diagram illustrating communication flow between components of the system of FIG. 1 for a logout initiated from an identity provider, in accordance with one embodiment.

FIG. 9 illustrates a logout initiated from the identity provider 18. The IdP transmits a logout to the security device 14 (1). The security device 14 disconnects the VPN connection with the client application 16 (2). An option may be provided to an administrator as to whether or not to disconnect from the VPN. For example, if the security device 14 receives a logout from IdP 18, either initiated from clientless or other service provider 19, the security device may disconnect the VPN tunnel for clientless. This may be left as an option to the administrator and implemented on the security device side, for example.

In one embodiment, the client application 16 may send a cancel request to the security device 14 at any time waiting for an SAML authentication response from the security device. Also, the client application 16 may display a dialog box to confirm action before opening the browser 17.

It is to be understood that the communication flows shown in FIGS. 6-9 and described above are only examples and that different network devices or processes may be used, without departing from the scope of the embodiments. Also, implementation of the embodiments in a VPN as described above is only an example. The embodiments may be used with any software service that supports both standalone client applications and web applications and wants to perform SSO authentication for both.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   extending web based single sign-on authentication to a client application to allow the client application to work with web browser based applications, extending web based single sign-on authentication comprising:
   initiating at the client application at a client device, said single sign-on authentication with a security device to create an out of band single sign-on based session key;
   receiving at the client application, a session identifier comprising said session key and location of a web portal for said single sign-on authentication from the security device, the session identifier generated by the security device and identifying a client session with the security device;
   launching a browser, by the client application, by passing the session identifier and the location of the web portal from the client application to the browser for use by the browser in said single sign-on authentication with the web portal in a single sign-on session bound to the client session by the session identifier, the browser installed at the client device and comprising a web application communicating with the security device;
   performing authentication at the client device through the web portal using the browser, with direct communication between the client application and the browser;
   receiving a notification at the client application that the authentication was successful; and
   performing a sign-in to an authentication server through the browser.

2. The method of claim 1 further comprising submitting login credentials via the browser.

3. The method of claim 1 further comprising transmitting an HTTP (Hypertext Transfer Protocol) GET request comprising the session identifier.

4. The method of claim 3 wherein the HTTP GET request redirects the client device to the web portal.

5. The method of claim 1 wherein the web portal location comprises a URL (Uniform Resource Locator).

6. The method of claim 1 further comprising receiving a timeout value with the session identifier and the web portal location.

7. The method of claim 1 wherein the session identifier comprises a session key generated by the security device upon receiving a login request from the client device.

8. The method of claim 1 wherein the session identifier identifies a client session between the client application and the security device and wherein the client session is associated with a web session generated at the security device based on communication between the browser and the security device.

9. An apparatus comprising:
   a hardware port interface for communication with a client device comprising a client application and a browser; and
   a processing device for:
   processing a request from the client application for a single sign-on authentication,
   receiving a web portal location,
   generating a client session between the apparatus and the client application to create an out of band single sign-on based session key,
   transmitting a client session identifier comprising said session key and the location of a web portal for said single-sign on authentication to the client application, and
   processing said single sign-on authentication by the processing device, with the browser using the client session identifier and the web portal location received from the browser;
   wherein the client session is associated with a web session used to perform said single-sign on authentication with the browser and wherein the browser comprises a web application functioning independently from the client application, the client application configured to launch the browser using security information obtained from the apparatus for use in said single sign-on authentication, and wherein direct communication between the client application and the browser allows the client application to use the browser to perform authentication; and
   wherein web based single sign-on is extended to the client application to allow the client application to work with web browser based applications.

10. The apparatus of claim 9 wherein processing said single sign-on authentication with the browser comprises processing an HTTP (Hypertext Transfer Protocol) GET request received from the browser and comprising the client session identifier.

11. The apparatus of claim 9 wherein processing said single sign-on authentication with the browser comprises receiving user credentials from the browser.

12. The apparatus of claim 9 wherein the processor is further configured to notify the client device of a successful authentication.

13. The apparatus of claim 9 wherein the session identifier comprises a session key generated by the security device upon receiving said request from the client device.

14. Logic encoded on one or more non-transitory computer readable media for execution and when executed perform the steps of:
  extending web based single sign-on authentication to a client application to allow the client application to work with web browser based applications, extending web based single sign-on authentication by:
  initiating at the client application at a client device, said single sign-on authentication with a security device to create an out of band single sign-on based session key;
  receiving at the client application, a session identifier comprising said session key and location of a web portal for said single sign-on authentication from the security device, the session identifier generated by the security device and identifying a client session with the security device;
  launching a browser, by the client application, by passing the session identifier and the location of the web portal from the client application to the browser for use by the browser in said single sign-on authentication with the web portal in a single sign-on session bound to the client session by the session identifier, the browser installed at the client device and comprising a web application communicating with the security device;
  performing authentication at the client device through the web portal using the browser, with direct communication between the client application and the browser:
  receiving a notification at the client application that the authentication was successful; and
  performing a sign-in to an authentication server through the browser.

15. The logic of claim 14 wherein the session identifier comprises a session key generated by the security device upon receiving a login request from the client device.

16. The logic of claim 14 wherein the session identifier identifies a client session between the client application and the security device and wherein the client session is associated with a web session generated at the security device based on communication between the browser and the security device.

17. The logic of claim 14 wherein the client application passes the session identifier and the web portal location in a one way communication between the client application and the browser upon launching the browser from the client application.

* * * * *